(12) United States Patent
Honda et al.

(10) Patent No.: US 7,055,853 B2
(45) Date of Patent: Jun. 6, 2006

(54) SIDE AIRBAG APPARATUS

(75) Inventors: Takashi Honda, Saitama (JP); Yusuke Nishida, Saitama (JP); Fumio Umezawa, Tochigi (JP)

(73) Assignees: Honda Giken Kogyo Kabushiki Kaisha, Tokyo (JP); TS Tech Co., Ltd., Saitama (JP)

( * ) Notice: Subject to any disclaimer, the term of this patent is extended or adjusted under 35 U.S.C. 154(b) by 192 days.

(21) Appl. No.: 10/352,444

(22) Filed: Jan. 28, 2003

(65) Prior Publication Data

US 2003/0141709 A1 Jul. 31, 2003

(30) Foreign Application Priority Data

Jan. 31, 2002 (JP) ............... 2002-023526
Jan. 31, 2002 (JP) ............... 2002-023536

(51) Int. Cl.
   B60R 21/16 (2006.01)
   B60R 21/20 (2006.01)
(52) U.S. Cl. ............................... 280/730.2
(58) Field of Classification Search ............ 280/730.2
   See application file for complete search history.

(56) References Cited

U.S. PATENT DOCUMENTS

| 5,222,761 A | * | 6/1993 | Kaji et al. ............... 280/730.2 |
| 5,316,336 A | * | 5/1994 | Taguchi et al. .......... 280/730.2 |
| 5,364,125 A | * | 11/1994 | Brown et al. ............ 280/730.2 |
| 5,556,128 A | * | 9/1996 | Sinnhuber et al. ....... 280/730.2 |
| 5,630,616 A | * | 5/1997 | McPherson ............. 280/730.2 |
| 5,890,732 A | * | 4/1999 | Nakamura et al. ......... 280/729 |
| 6,343,810 B1 | * | 2/2002 | Breed ...................... 280/730.2 |
| 6,349,964 B1 | * | 2/2002 | Acker et al. ............. 280/730.2 |
| 6,612,611 B1 | * | 9/2003 | Swann et al. ............ 280/730.2 |
| 6,755,273 B1 | * | 6/2004 | Breed ........................ 180/274 |

FOREIGN PATENT DOCUMENTS

| JP | 10-029491 | 2/1998 |
| JP | 10-273010 | 10/1998 |
| JP | 2000-280851 | 10/2000 |

* cited by examiner

*Primary Examiner*—Eric Culbreth
(74) *Attorney, Agent, or Firm*—Carrier, Blackman & Associates, P.C.; Joseph P. Carrier; William D. Blackman

(57) ABSTRACT

A side airbag apparatus, which deploys an airbag between an occupant of a vehicle and a sidewall of said vehicle in order to protect the occupant in the event of side collision of the vehicle, includes a lower air bag unit and a control unit. The lower airbag unit has a waist airbag, which deploys toward the hip of the occupant M and pushes the hip of the occupant M in the direction opposite to the sidewall, an inflator, which generates gas for inflating the waist airbag and supplies gas to the waist airbag, and a module case, which stores the waist airbag and inflator therein. The control unit ignites the inflator in order to generate gas when an acceleration of greater than a prescribed value is detected.

20 Claims, 16 Drawing Sheets

SIDE AIRBAG APPARATUS

BACKGROUND OF THE INVENTION

1. Field of the Invention

The present invention relates to the side airbag apparatus, which protects the occupant of a vehicle against injury in the event of side collision by inflating the airbag into a vehicle cabin from the airbag module. More specifically, the present invention relates to the side airbag apparatus, which can surely protect the occupant of a vehicle against injury.

2. Description of Relevant Art

In the conventional side airbag apparatus, which protects the occupant of a vehicle against injury in the event of side collision, the airbag is inflated towards the region between the occupant and the door so as to protect an occupant of a vehicle against injury. In that occasion, the airbag is inflated form the module case accommodated within the door or the seat of the vehicle As an example of this types of conventional side airbag apparatus, there is provided the side airbag apparatus disclosed in Japanese unexamined patent publications H10-273010, H10-29491, and 2000-280851.

In the conventional side airbag apparatus, the airbag is deployed towards the space between the occupant and the door so that the occupant M will not bump against the door by the shock of collision. In the conventional side airbag apparatus, furthermore, the airbag is deployed into the vehicle cabin in order to keep the occupant under the restraint by the inflated airbag.

SUMMARY OF THE INVENTION

The present invention relates to the side airbag apparatus, which deploys an airbag between an occupant of the vehicle and the sidewall of the vehicle in order to protect the occupant in the event of side collision of the vehicle.

This side airbag apparatus has a lower airbag unit and a control unit. The lower airbag unit has a waist airbag, which deploys toward the hip of the occupant and pushes the hip of the occupant in the direction opposite to the sidewall, an inflator, which generates gas for inflating the waist airbag and supplies gas to the waist airbag, and a module case, which stores the waist airbag and the inflator therein. The control unit ignites the inflator in order to generate gas when the accelerated velocity of greater than the prescribed value is detected.

This side airbag apparatus may contain an upper airbag unit. This upper airbag unit has a shoulder airbag, which deploys toward the shoulder of the occupant and pushes the shoulder of the occupant in the direction opposite to the sidewall, an inflator, which generates gas for inflating the shoulder airbag and supplies gas to the shoulder airbag, and a module case, which stores the shoulder airbag and the inflator therein.

According to the side airbag apparatus having these constructions, the occupant M is moved in the direction kept away from the sidewall of the vehicle by the fully inflated airbag. Thus, space is compellingly secured between the occupant and the sidewall of the vehicle than the conventional airbag apparatus. Thus, the occupant M may be prevented from colliding with the door 11, which is rushed into the vehicle cabin in the event of side collision with other vehicle. Thereby, the possibility of injury of the occupant can be reduced.

DETAILED DESCRIPTION OF THE PREFERRED EMBODIMENT

First Embodiment

The preferred embodiments of the present invention will now be described with reference to FIGS. 1-4 of the attached drawings with appropriately.

Figure 2:
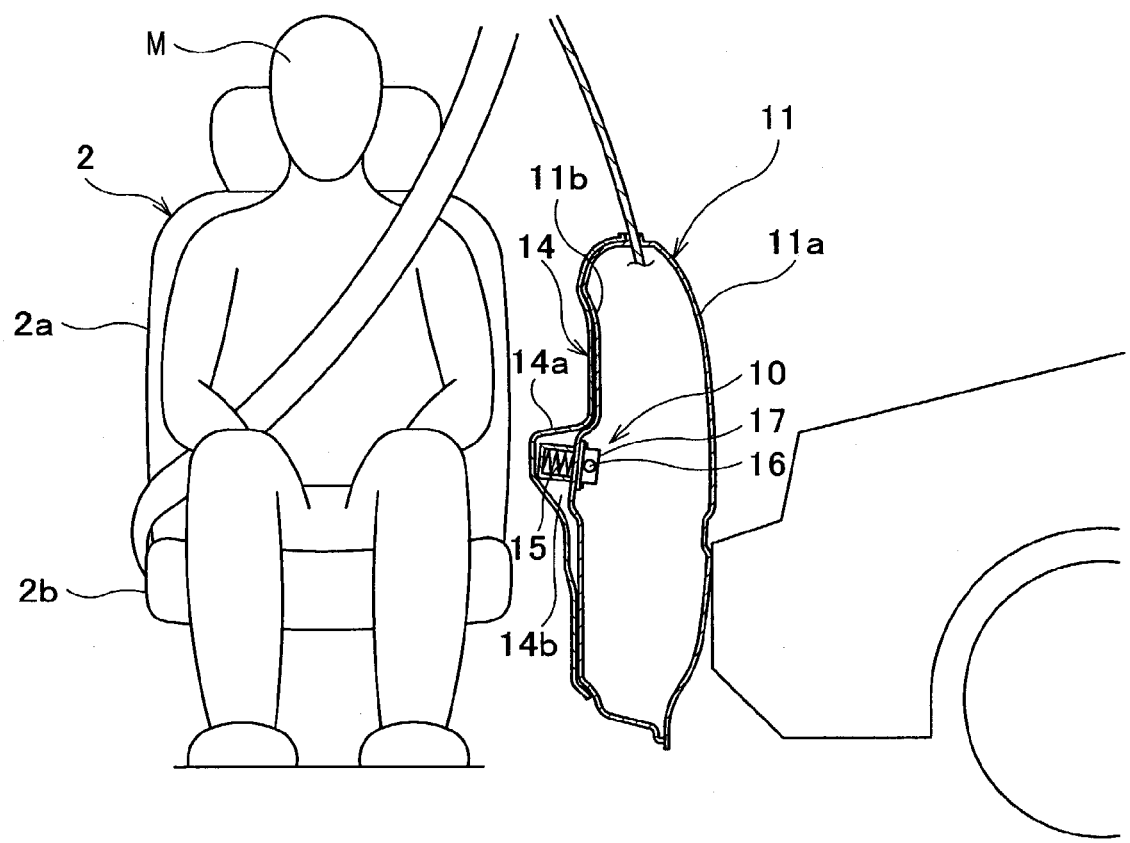
FIG. 2 is a front view showing the side airbag apparatus of the first preferred embodiment.

As shown in FIG. 2, the side airbag apparatus 10 has an airbag 15 and an inflator 16. This inflator 16 generates gas for inflating the airbag 15, and is stored in a module case 17 together with the airbag 15. This module case 17 is provided at the inside of a door 11, which is one of the sidewalls of a vehicle body. In the present embodiment, a lower airbag module is composed of the airbag 15, the inflator 16, and module case 17. Here, the term sidewall refers to the vehicle's components located sideward with respect to the occupant M. Examples of these components include, but are not limited to, a door, a pillar, and a wall.

The door 11 is composed of an inner panel 11b and an outer panel 11a. The inner panel 11b is a structural member of the door 11. The outer panel 11a is an exterior of the vehicle body. The inner panel 11b and the outer panel 11a are joined at both ends, that is, top edge and bottom edge, by welding.

In the present embodiment, as shown in FIG. 2, there is provided only one inner panel 11b in the door 11. But the number of such inner panels is not limited to a single panel. For example, the door 11 may have a plurality of inner panels.

The inner panel 11b has a door trim 14 at the vehicle cabin side thereof. This door trim 14 is composed of upholstery and a base obtained by the injection molding of resin etc.

An armrest 14a, which projects inside of the vehicle cabin, is provided at the central position in the height direction of the door-trim 14. This armrest 14 is made in midair. This midair part serves as an airbag-shed 14b. That is, the space formed between the inner panel 11b and the armrest 14a is used as the airbag-shed 14b.

The armrest 14a has a tear line (not shown), which is a filiform, or threadlike, part having a thin thickness. This tear line is easily broken by the inflated airbag 15 so that the inflated airbag 15 deploys into the vehicle cabin, when the airbag is fully inflated.

Figure 3A:
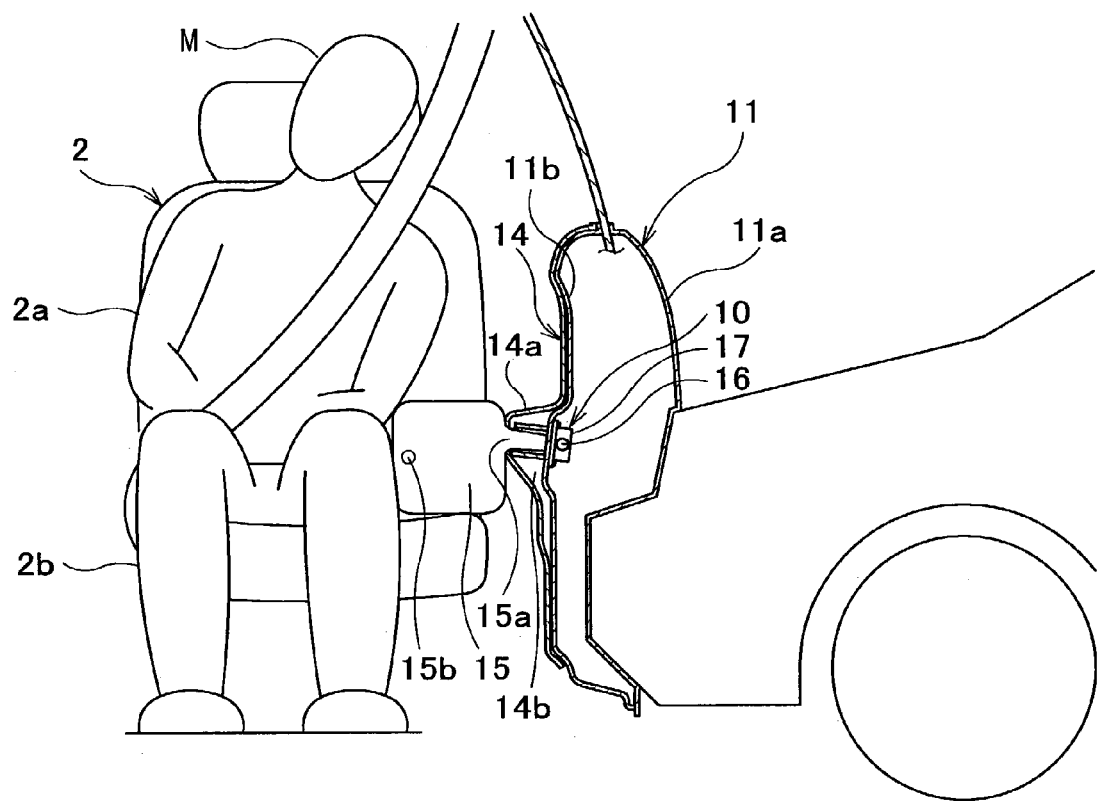
FIG. 3A is a front view showing the side airbag apparatus at the time of operation.

As shown in FIG. 2 and FIG. 3A, the air bag 15 has a gas inlet 15a and a gas outlet 15b, and is stored in the airbag module 17 in the folded condition. This airbag module 17 is fixed at the inner panel 11b so that the airbag 15 is positioned in the airbag-shed 14b. The gas inlet 15a is connected with the gas outlet of the inflator 16.

The inflator 16 spouts gas rapidly into the airbag 15 according to the signal outputted from the acceleration sensor 131 (described later in detail). This signal is generated when the accelerated velocity of greater than the prescribed value is given to the vehicle. In other words, this signal is generated when a side collision is occurring. This inflator 16 is also accommodated in the module case 17 fixed at the inner panel 11b.

Figure 4A:
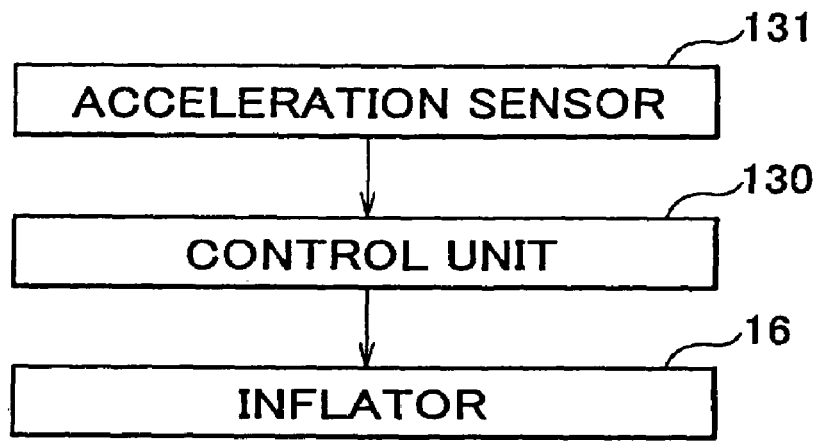
FIG. 4A is an explanation view showing the construction of the system of the side airbag apparatus.

As shown in FIG. 4, this inflator 16 is connected with the control unit 130, and this control unit 130 is connected with the acceleration sensor 131. The control unit 130 ignites the inflator 16, when the acceleration sensor 131 detects the accelerated velocity of greater than the prescribed value.

Figure 3B:
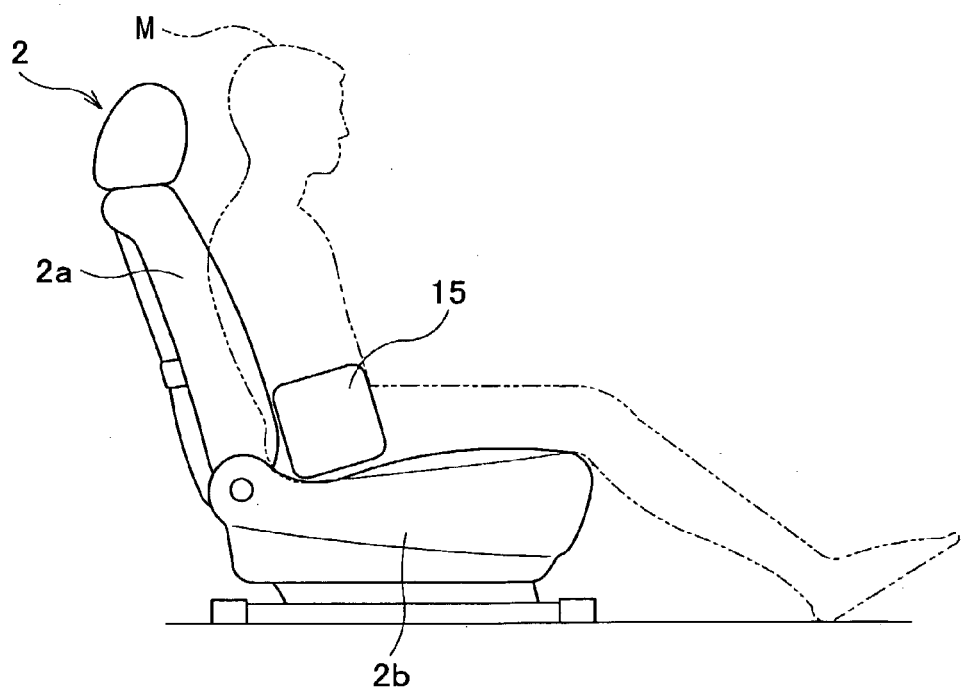
FIG. 3B is a side view showing the side air bag apparatus at the time of operation.

The airbag 15 has a bag shape and is deployed toward the hip of the occupant M when the airbag 15 is inflated. The fully inflated airbag 15 reaches the region where the hip of occupant M is positioning. In other words, as shown in FIG. 3B, the airbag 15 is inflated toward the corner between the seatback 2a and the seat cushion 2b from the side with respect to the occupant M. Here, the area from the occupant's buttock to the waist through the hip is covered by the fully inflated airbag 15.

The size of the gas outlet 15b is made smaller than that of a conventional airbag in order to retain the gas pressure in the airbag 15 at high pressure by preventing the rapid outgassing as compared to the conventional airbag. Here, "high" gas pressure means that there is sufficient gas pressure to push the occupant M aside.

Figure 1:
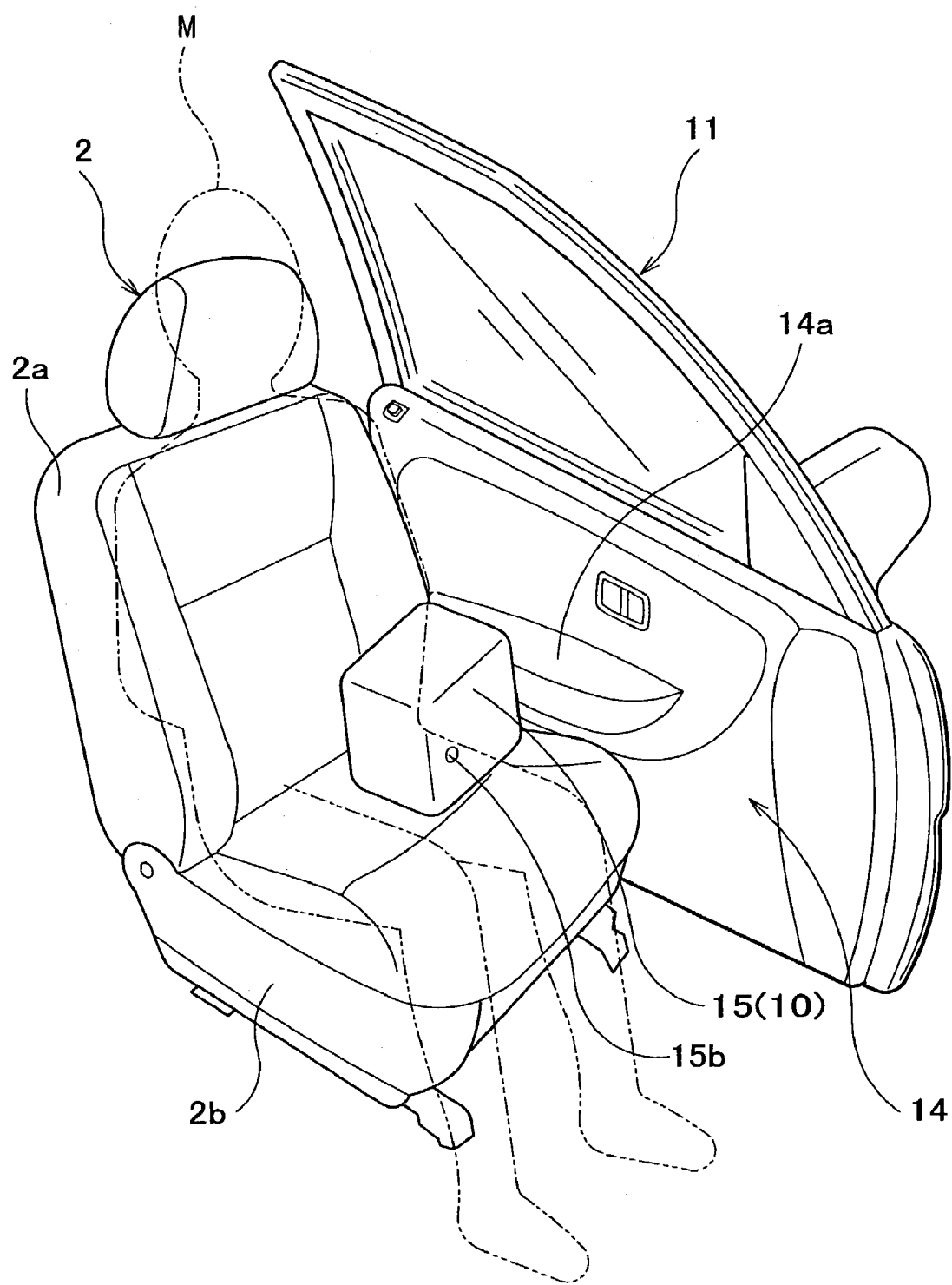
FIG. 1 is a perspective view showing the inflated side airbag apparatus according to the first preferred embodiment of the present invention.

According to the side airbag apparatus 10 having these constructions, as shown in FIG. 1, FIG. 3A, and FIG. 3B, the occupant M of the vehicle is protected against injury by the inflated airbag 15 in the event of accident.

To be more precise, when the acceleration sensor 131 detects collision force brought out from side collision with other vehicle, the control unit 130 ignites the inflator 16 in order to spout gas from the inflator 16 in response to the detected collision force. The gas blowout from inflator 16 is injected into the airbag 15 through the gas inlet 15a, and then the airbag 15 is inflated. The airbag 15 inflated by the gas bursts through the tear line, and deploys toward the hip of the occupant M in the vehicle cabin. Then, the inflated airbag 15 reaches to the region where the hip of the occupant M is positioned. Thus, the occupant M of the vehicle is pushed inward of the vehicle, that is, the occupant M is moved in the direction kept away from the sidewall of the vehicle by the filly inflated airbag 15. Thereby, space is compellingly secured between the occupant M and the sidewall of the vehicle. As shown, when the deployed airbag deploys toward the hip of the occupant, it contacts at least one of the occupant's waist, leg and belly while substantially avoiding contact with the vehicle seat so as to move the occupant relative to the vehicle seat and sidewall, and pushes the occupant in the direction opposite to the sidewall.

According to this secured space, the possibility of injury of the occupant M can be reduced, because the occupant M may be prevented from colliding with the door 11, which is rapidly deformed into the vehicle cabin in the event of side collision with another vehicle.

Second Embodiment

Next, the second preferred embodiment of the present invention will now be explained with reference to FIG. 5A and FIG. 5B. In the following explanation, the components, which are the same as described in the first preferred embodiment, are indicated by the same symbol and the explanation thereof is omitted.

Figure 5A:
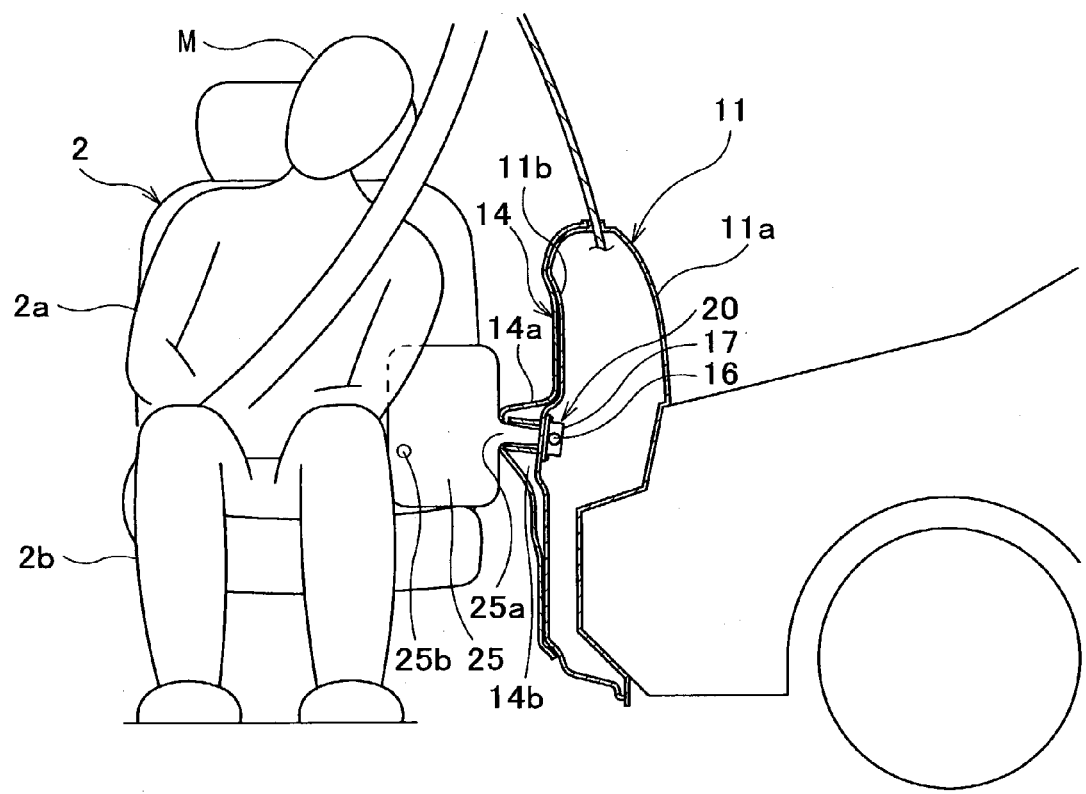
FIG. 5A is a front view showing the inflated side airbag of the side airbag apparatus according to the second preferred embodiment.
Figure 5B:
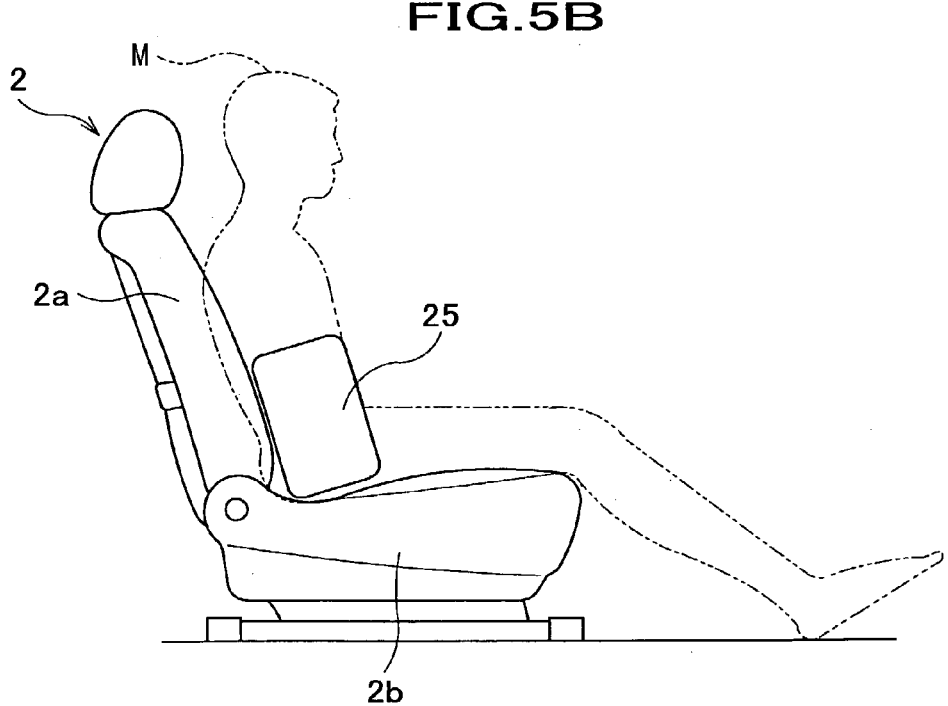
FIG. 5B is a side view showing the inflated airbag of the side airbag apparatus according to the second preferred embodiment.

As shown in FIG. 5A and FIG. 5B, the side airbag apparatus 20 according to the second preferred embodiment of the present invention has an airbag 25 and an inflator 16. The airbag 25 stored in the module case 17 together with the inflator 16 is accommodated in an airbag-shed 14b, which is formed between the inner panel 11b of the door 11 and the armrest 14a of the door trim 14. The inflator 16 generates gas for inflating the airbag 25 and supplies it to the airbag 25. In the present embodiment, a lower airbag unit is composed of the airbag 25, the inflator 16, and the module case 17.

The airbag 25 has a bag shape and is deployed to the region from the hip to the belly of the occupant M, when the airbag 25 is inflated. In this region, furthermore, the buttock and the waist are also contained. In other words, the inflated airbag 25 has a sufficient size for covering the region, in which a hip, a buttock, a waist, and a belly of the occupant M is positioning.

The airbag 25 has a gas inlet 25a and the gas outlet 25b as well as the airbag 15 of above described first preferred embodiment.

According to the airbag apparatus 20 of these constructions, when side collision with other vehicle is happened and the acceleration sensor 131 detects the collision force, the control unit 130 ignites the inflator 16 in order to spout gas from the inflator 16 in response to the detected collision force.

The gas blowout from inflator 16 is injected into the airbag 25 through the gas inlet 25a, and then the airbag 25 is inflated. The airbag 25 inflated by the gas bursts through the tear line, and deploys toward the hip and belly of the occupant M in the vehicle cabin. Then, the inflated airbag 25 reaches to the region where the hip and belly of the occupant M are positioning. Thus, the occupant M of the vehicle is pushed inward of the vehicle, that is, the occupant M is moved in the direction kept away from the sidewall of the vehicle by the inflated airbag 25. Thereby, the space is compellingly secured between the occupant M and the sidewall of the vehicle.

According to this secured space, the possibility of injury of the occupant M can be reduced, because the occupant M may be prevented from colliding with the door 11, which is rushed into the vehicle cabin in the event of side collision of the vehicle.

According to the airbag apparatus of this second embodiment, the protection of the occupant M of the vehicle against injury in the event of side collision can accurately be achieved, because the occupant M is moved in the direction opposite to the sidewall by pushing with the fully inflated airbag 25. In this occasion, since the airbag 25 is larger than the airbag 15 of first embodiment, the occupant M is pushed with the larger area of the airbag. Thereby, the physical demands on the occupant's body can be reduced than that of first embodiment.

Third Embodiment

Next, third preferred embodiment of the present invention will now be explained with reference to FIG. 6. In the following explanation, the components, which are the same as described in the first preferred embodiment, would be indicated by the same symbol and the explanation thereof are omitted.

Figure 6A:
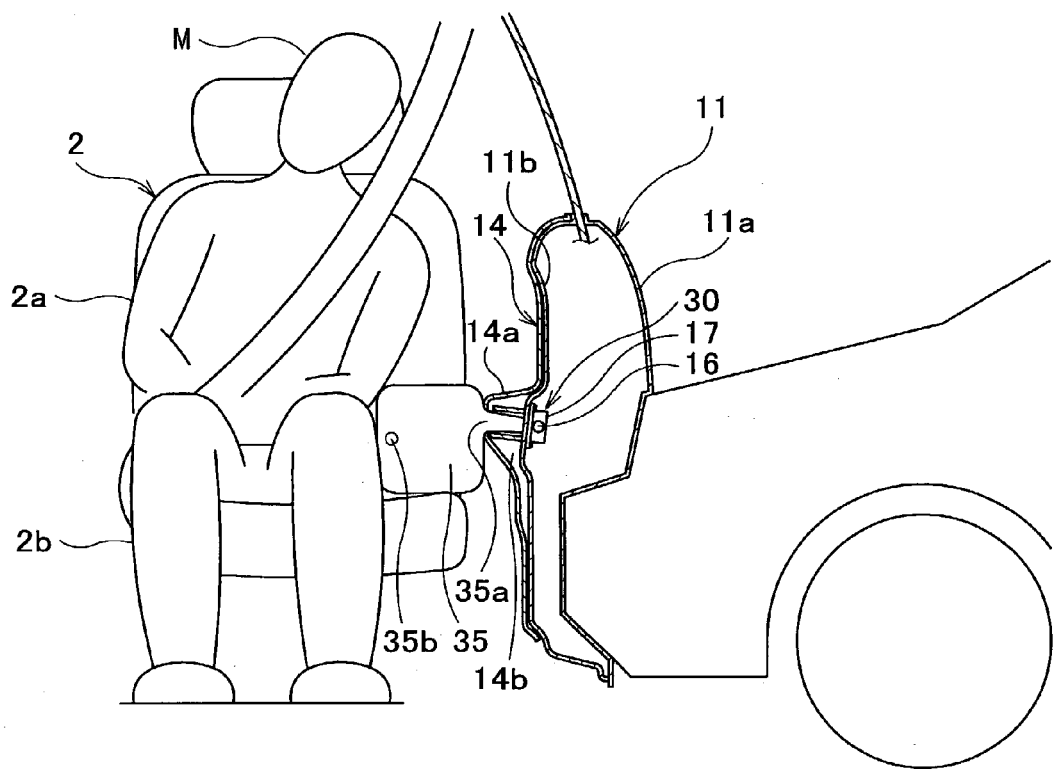
FIG. 6A is a front view showing the inflated airbag of the side airbag apparatus according to the third preferred embodiment.
Figure 6B:
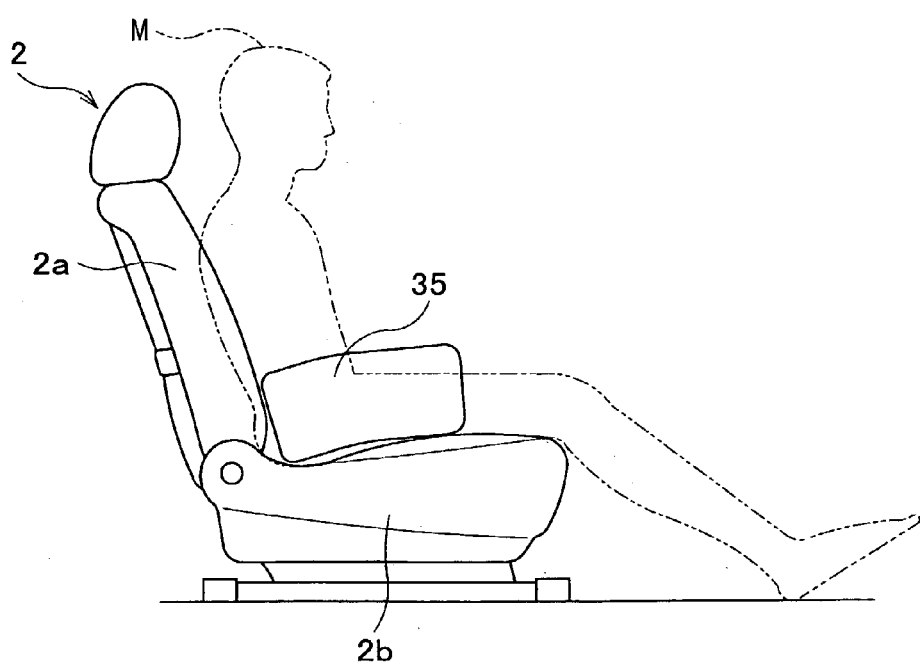
FIG. 6B is a side view of showing the inflated airbag of the side airbag apparatus.

As shown in FIG. 6A and FIG. 6B, the side airbag apparatus 30 according to the third preferred embodiment of the present invention has an airbag 35 and an inflator 16. The airbag 35 stored in the module case 17 together with the inflator 16 is accommodated in an airbag-shed 14b formed between the inner panel 11b of the door 11 and the armrest 14a of the door trim 14. The inflator 16 generates gas for inflating the airbag 35 and supplies it to the airbag 35. In the present embodiment, a lower airbag module is composed of the airbag 35, the inflator 16, and module case 17.

The airbag 35 has a bag shape and is deployed toward the region from a waist to a leg, specifically, the region from a waist to a knee through a thigh of the occupant M, when the airbag 35 is inflated. In other words, the airbag 35 has a sufficient size for covering the region, in which a waist, a hip, a buttock, and a leg of the occupant M is positioning.

The airbag 35 has a gas inlet 35a and a gas outlet 35b as well as the airbag 15 of above described first preferred embodiment.

According to the airbag apparatus 30 of these constructions, when the side collision with other vehicle is happened and the acceleration sensor 131 detects collision force, the control unit 130 ignites the inflator 16 in order to spout gas from the inflator 16 in response to the detected collision force.

The gas blowout from inflator 16 is injected into the airbag 35 through the gas inlet 35a, and then the airbag 35 is inflated. The airbag 35 inflated by the gas bursts through the tear line, and deploys toward the hip and leg of the occupant M in the vehicle cabin. Then, the inflated airbag 35 reaches to the region where the hip and leg of the occupant M are positioning. Thus, the occupant M of the vehicle is pushed inward of the vehicle, that is, the occupant M is moved in the direction kept away from the sidewall of the vehicle by the fully inflated airbag 35. Thereby, space is compellingly secured between the occupant M and the sidewall of the vehicle.

According to this secured space, the possibility of injury of the occupant M can be reduced, because the occupant M may be prevented from colliding with the door 11, which is rushed into the vehicle cabin in the event of the side collision of the vehicle.

According to the present invention, the airbag apparatus which has the airbag deployed to the region ranging from the hip to the waist of the occupant M as well as the airbag deployed to the region ranging from the hip to the leg of the occupant M, can be used. This airbag apparatus is formed by including the features from both the airbag apparatus disclosed in the above-described second preferred embodiment and that of disclosed in this third preferred embodiment.

In this case, the occupant M is moved inward of the vehicle by pushing with further wide contact range of the airbag. Thus, the physical demands on the occupant's body as a result of the inflation of the airbag can be reduced.

Fourth Embodiment

Next, the fourth preferred embodiment of the present invention will now be explained with reference to FIG. 7. In the following explanation, the components, which are the same as described in the first preferred embodiment are indicated by the same symbol, and the explanation thereof is omitted.

Figure 7:
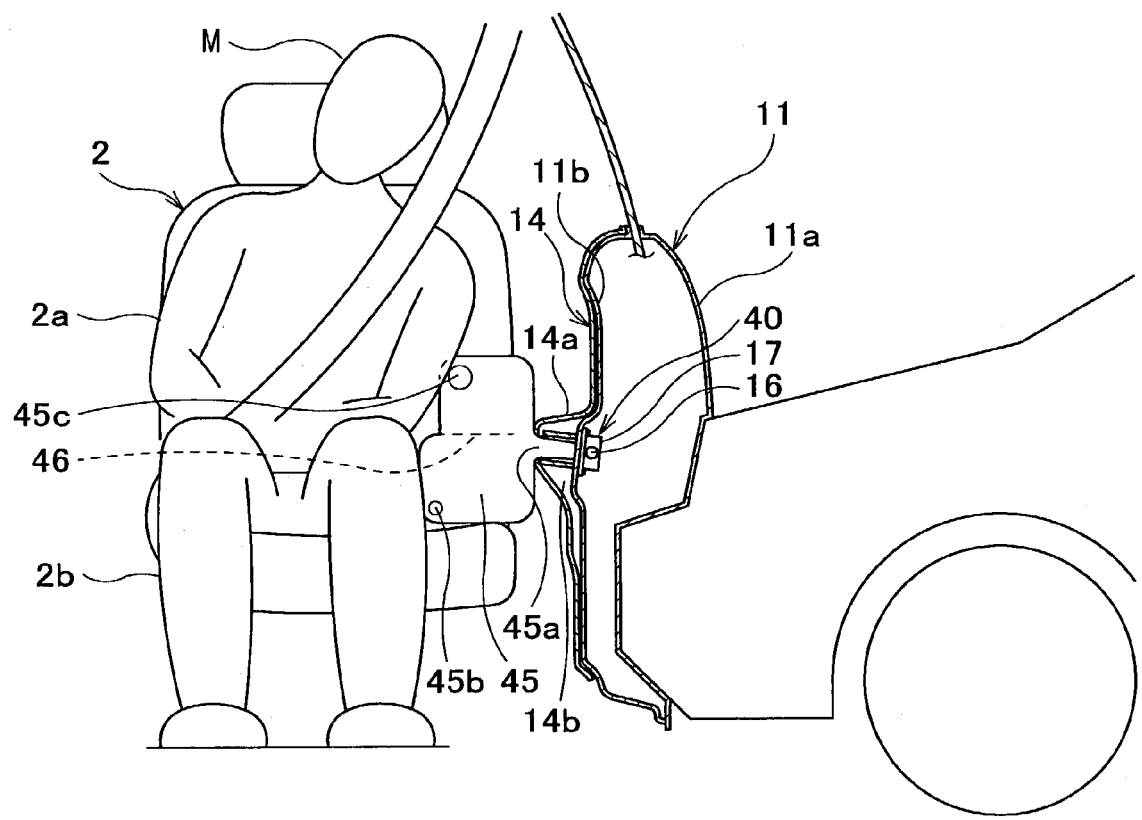
FIG. 7 is a front view showing the inflated airbag of the side airbag apparatus according to the fourth preferred embodiment.

As shown in FIG. 7, the side airbag apparatus 40 according to the fourth preferred embodiment of the present invention has an airbag 45 and an inflator 16. The airbag 45 stored in the module case together with the inflator 16 is accommodated in an airbag-shed 14b, which is formed between the inner panel 11b of the door 11 and the armrest 14a of the door trim 14. The inflator 16 generates gas for inflating the airbag 45 and supplies it to the airbag 45. In the present embodiment, a lower airbag unit is composed of the airbag 45, the inflator 16, and module case 17.$$

The airbag 45 has a bag shape and is deployed toward the region from a hip to a belly of the occupant M when the airbag 45 is inflated. In other words, the airbag 45 is inflated toward region, in which the hip and belly of the occupant M is positioning.

The airbag 45 is divided into two parts by the partition 46. One is the part deploys toward the hip of the occupant M, and the other is the part deploys toward the belly of the occupant M. Herein after, the part deployed toward the hip is defined as "hip part", and the part deployed toward the belly is defined as "belly part".

The airbag 45 has a gas inlet 45a, a gas outlets 45b, and a gas outlet 45c. The gas outlets 45b and the gas outlet 45c are provided at the hip part and the belly part of the airbag 45, respectively.

The size of the gas outlet 45c provided on the belly part of the airbag 45 is made larger than that of the gas outlet 45b provided on the hip part of the airbag 45 so that the pressure of the belly part of the airbag 45 becomes smaller than that of the hip part. In the present embodiment, furthermore, the hip part of the airbag 45 is protruding towards the occupant M side than the belly part of the airbag 45.

According to the side airbag apparatus 40 having these constructions, when the side collision with other vehicle is happened and the acceleration sensor 131 detects collision force, the control unit 130 ignites the inflator 16 in order to spout gasses from the inflator 16. The gas blowout from inflator 16 is injected into the airbag 45 through the gas inlet 45a, and then the airbag 45 is inflated. The airbag 45 inflated by the gas bursts through the tear line, and deploys toward the hip and the belly of the occupant M in the vehicle cabin. Then, the inflated airbag 15 reaches to the region where the hip and belly of the occupant M are positioning. Thus, the occupant M of the vehicle is pushed inward of the vehicle, that is, the occupant M is moved in the direction kept away from the sidewall of the vehicle by the inflated airbag 45.

In this occasion, since the size of the gas outlet 45c is larger than the gas outlet 45b, the gas exhausted from the belly part is larger than that of exhausted from the hip part. Thereby, the belly part of the airbag 45 is deployed with smaller momentum than the hip part of the airbag 45. Then, the belly of the occupant M is pushed with weaker force than the hip of the occupant M.

Accordingly, since the belly of the occupant M is pushed aside with comparatively weak force, the physical demands on the occupant's body as a result of the collision with the fully inflated airbag 45 can be reduced. That is, since the belly of the occupant M cannot bear high load, the belly of the occupant M is subsidiary pushed in order to reduce the physical demands to the belly of the occupant M.

In the present embodiment, additionally, since space is compellingly secured between the occupant M and the sidewall of the vehicle, the occupant M is secured against injury in the event of side collision.

In this fourth preferred embodiment, the airbag comprising a hip part and the belly part, which are formed as a single body, is adopted. But an airbag apparatus may be provided in which the airbag for a hip of the occupant M and the airbag for a belly of the occupant M are separate from each other.

Fifth Embodiment

Next, fifth preferred embodiment of the present invention will now be explained with reference to FIG. 8 through FIG. 10. In the following explanation, the components which are the same as described in the first preferred embodiment would be indicated by the same symbol and the explanation thereof are omitted.

Figure 8:
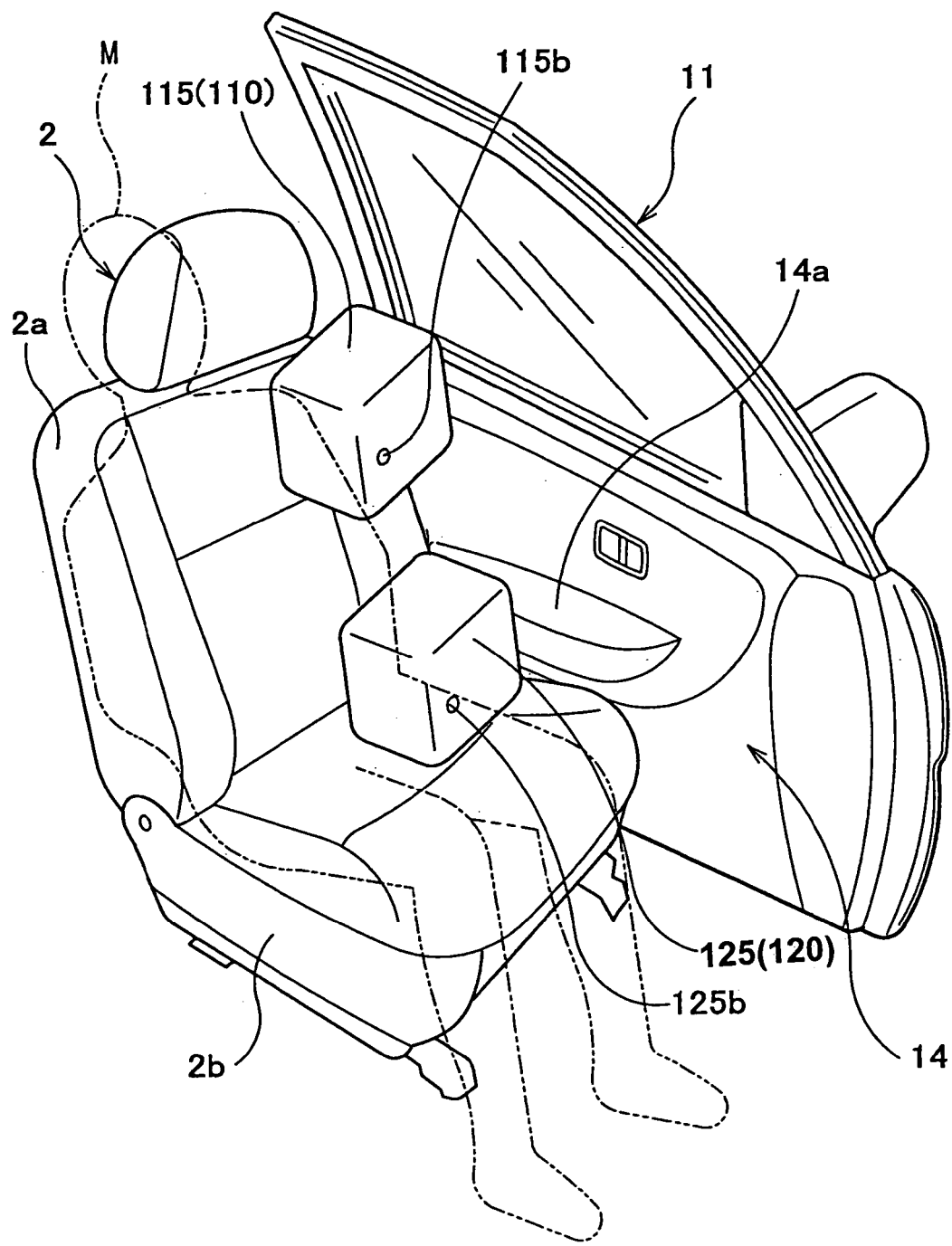
FIG. 8 is a perspective view showing the inflated side airbag apparatus according to the fifth preferred embodiment of the present invention.
Figure 9:
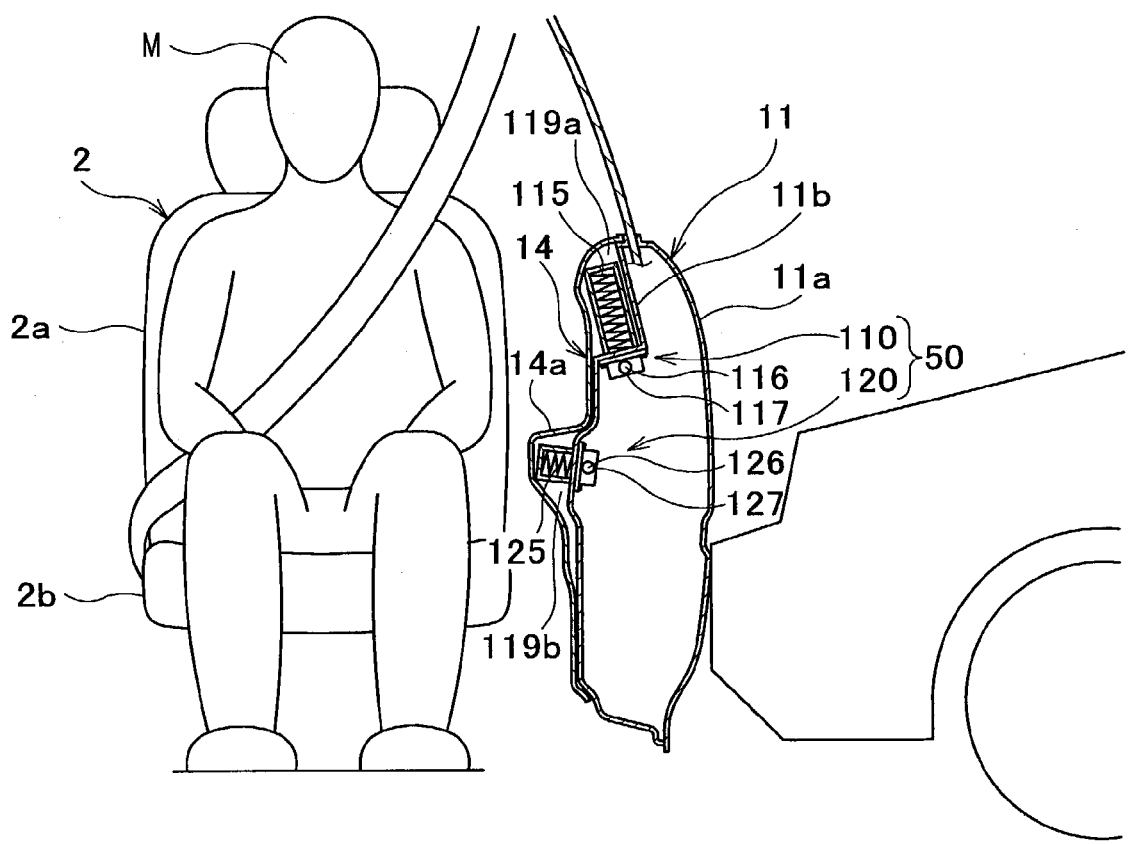
FIG. 9 is a front view showing the side airbag apparatus according to the fifth preferred embodiment.

As shown in FIG. 8 and FIG. 9, the side airbag apparatus 50 according to the fifth preferred embodiment of the present invention has a shoulder airbag apparatus 110 and a waist airbag apparatus 120. The occupant M of the vehicle is sitting on a seat 2 comprising a seatback 2a and a seat cushion 2b.

The door 11 is composed of an inner panel 11b and an outer panel 11a. The inner panel 11b is a structural member of the door 11. The outer panel 11a is an exterior of the vehicle body. The inner panel 11b and the outer panel 11a are joined at both ends, that is, top edge and bottom edge, by welding.

The inner panel 11b has an armrest 14a at the vehicle cabin side thereof. This armrest 14 is made in midair. This midair part serves as an airbag-shed 119b. That is, the space formed between the inner panel 11b and the armrest 14a is used as the airbag-shed 119b for accommodating the waist airbag.

The upper part of the inner panel 11b is bent inwardly in order to form the recessed part on the door 11. This recessed part is used as a shoulder airbag-shed 119a.

The door trim 14, which covers this recessed part and forms the shoulder airbag-shed 119a, has a tear line (not shown) at the upper part thereof. This tear line is easily broken by the inflated shoulder airbag 115 so that inflated airbag 115 deploys into the vehicle cabin.

As shown in FIG. 9, the shoulder airbag apparatus 110 has a shoulder airbag 115 and an inflator 116, which are accommodated in a module case 117. The inflator 116 spouts gas to the shoulder airbag apparatus 110. In the present embodiment, a upper airbag unit is composed of the shoulder airbag 115, the inflator 116, and module case 117.

Figure 10A:
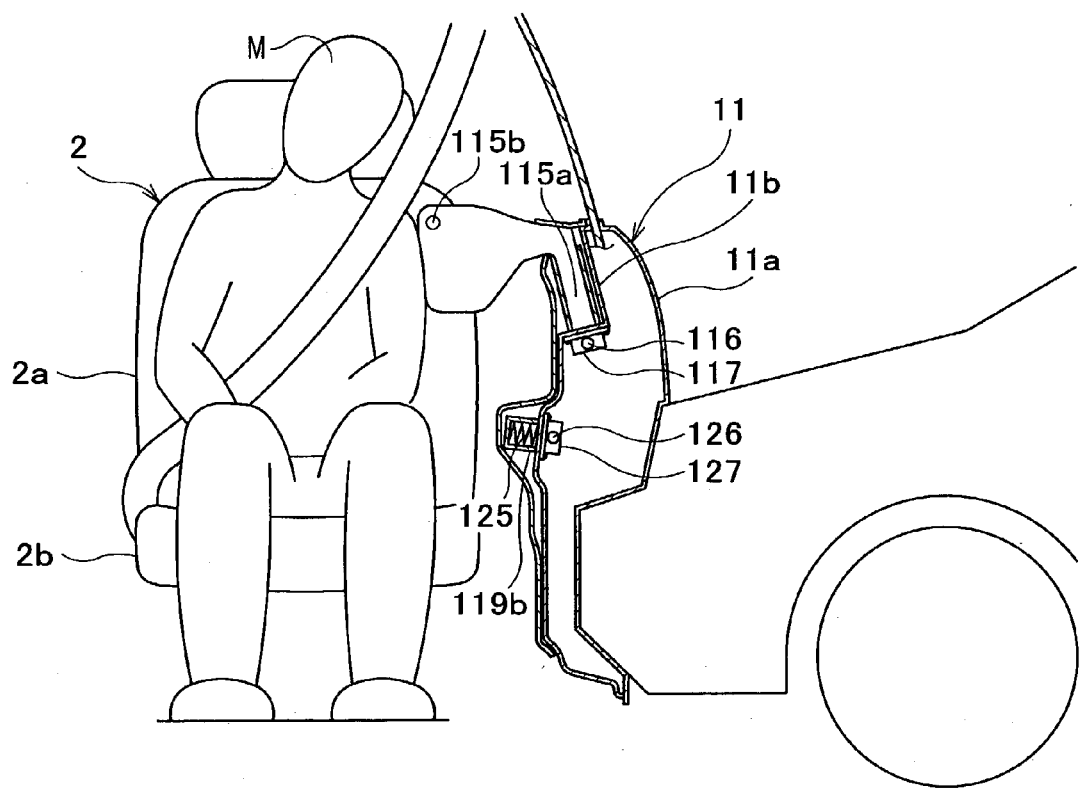
FIG. 10A is a front view showing operative condition of the side airbag apparatus according to the fifth preferred embodiment.

As shown in FIG. 9 and FIG. 10A, the shoulder airbag 115 has a gas inlet 115a and a gas outlet 115b, and is stored in a module case 117 in the folded condition. This module case 117 is accommodated in the shoulder airbag-shed 119a. The gas inlet 115a is connected with a gas outlet of the inflator 116.

The inflator 116 spouts gas rapidly into the shoulder airbag 115 according to the signal outputted from the accelerator sensor 131. This signal is generated when the accelerated velocity of greater than the prescribed value is given to the vehicle. In other words, this signal is generated when side collision is occurring. This inflator 116 is accommodated in the module case 117 fixed at the inner panel 11b.

The shoulder airbag 115 has a bag shape and is deployed toward the shoulder of occupant M when the shoulder airbag 115 is inflated. The fully inflated shoulder airbag 115 reaches the region where the shoulder of occupant M is positioning.

The size of the gas outlet 115b is made smaller than that of a conventional airbag in order to retain the gas pressure in the shoulder airbag 115 at high pressure by preventing the rapid outgassing as compared to the conventional airbag. Here, "high" gas pressure means that there is sufficient gas pressure to push the occupant aside.

Figure 10B:
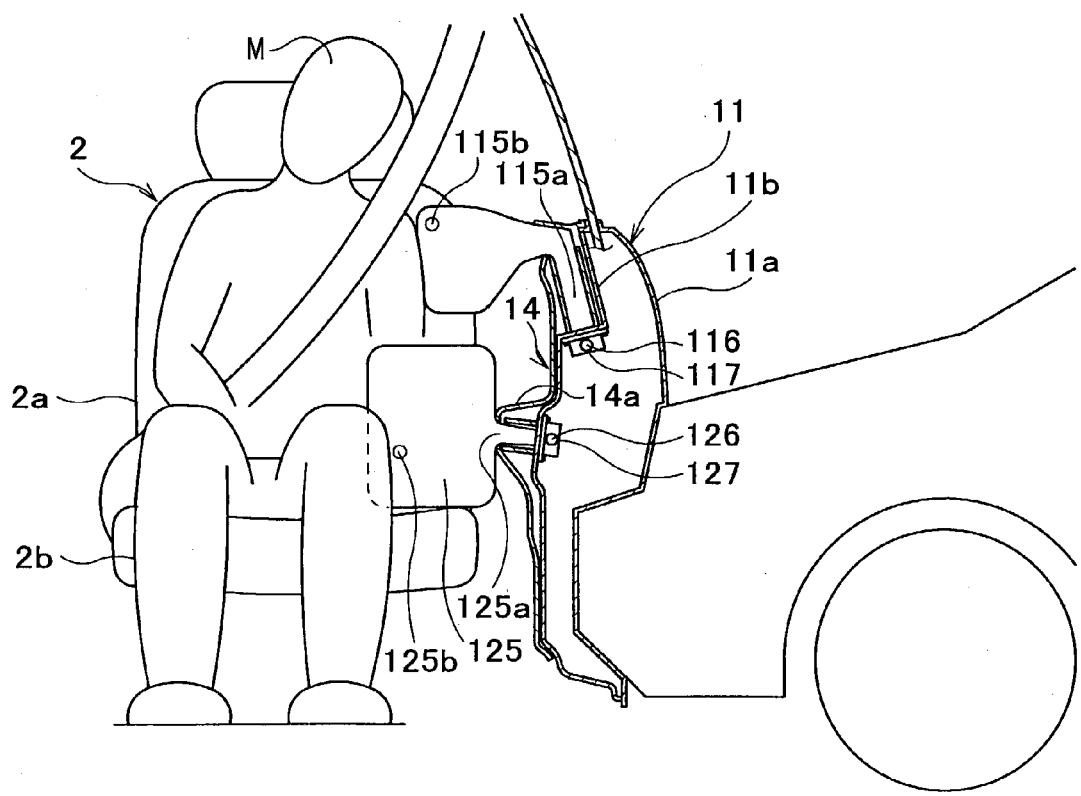
FIG. 10B is a front view showing operative condition of the side airbag apparatus according to the fifth preferred embodiment.

As shown in FIG. 9 through FIG. 10B, the waist airbag apparatus 120 has a waist airbag 125 and an inflator 126. This inflator 126 generates gas for inflating the waist airbag 125, and is accommodated in a module case 127 together with the waist airbag 125. In the present embodiment, a lower airbag unit is composed of the airbag 125, the inflator 126, and module case 127.

As shown in FIG. 10B, the waist airbag 125 has a gas inlet 125a and a gas outlet 125b, and is stored in the module case 127 in the folded condition. This module case 127 is accommodated in the waist airbag-shed 119b. The gas inlet 125a is connected with the gas outlet of the inflator 126.

In the present embodiment, the airbag used in the above described from first to fourth embodiment may be adoptable as a waist airbag.

The inflator 126 spouts gas rapidly into the waist airbag 125 according to the signal outputted from the accelerator sensor 131. This signal is generated when an acceleration greater than the prescribed value is given to the vehicle. In other words, this signal is generated when the side collision is happening. This inflator 126 is accommodated in the module case 127 fixed at the inner panel 11b.

The waist airbag 125 has a bag shape and is deployed toward the hip of occupant M when the waist airbag 125 is inflated. The most inflated waist airbag 125 reaches the region where the hip of occupant M is positioning. In other words, the waist airbag 125 is inflated toward the corner between the seatback 2a and the seat cushion 2b from the side part with respect to the occupant M.

The size of the gas outlet 125b is made smaller than that of a conventional airbag in order to retain the gas pressure in the waist airbag 125 by preventing the rapid outgassing as compared to the conventional airbag.

Figure 4B:
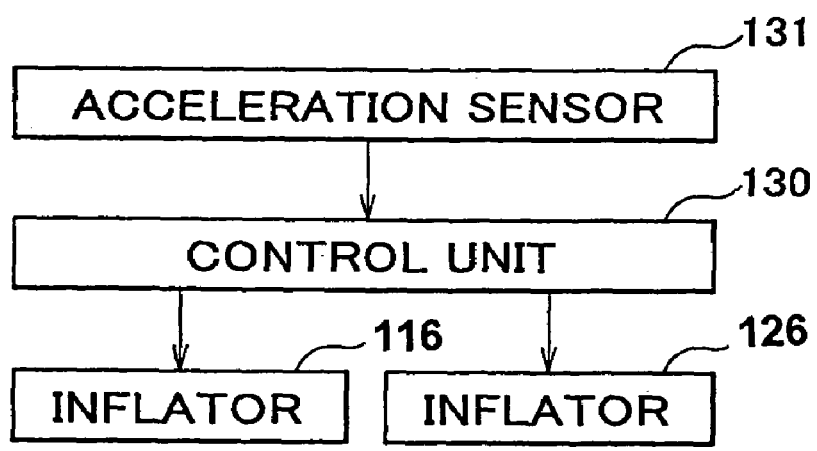
FIG. 4B is an explanation view showing another construction of the system of the side airbag apparatus.

As shown in FIG. 4B, the inflator 116 for shoulder airbag 115 and the inflator 126 for waist airbag 125 are connected with the control unit 130, and this control unit 130 is connected to the acceleration sensor 131. The control unit 130 ignites the inflators 116 and 126, when the acceleration sensor 131 detects an acceleration greater than the prescribed value.

In that occasion, the control unit 130 ignites the inflator 116 prior to the inflator 126. After predetermined time progress, the control unit 130 ignites the inflator 126.

According to the side airbag apparatus 50 having these constructions, as shown in FIG. 9, FIG. 10A, and FIG. 10B, the occupant M of the vehicle is protected against injury by the inflated airbags, that is, the shoulder airbag 115 and the waist airbag 125. To be more precise, when the side collision with another vehicle is happening and the acceleration sensor 131 detects an acceleration associated with a collision force, the control unit 130 ignites the inflator 116 in order to spout gas from the inflator 116 in response to the detected collision force. The gas blowout from the inflator 116 is injected into the shoulder airbag 115 through the gas inlet 115a, and then the shoulder airbag 115 is inflated. The shoulder airbag 115 inflated by the gas bursts through the tear line, and deploys toward the shoulder of the occupant M in the vehicle cabin. Then, the inflated shoulder airbag 115 reaches to the region where the shoulder of the occupant M is positioned. Thus, the occupant M of the vehicle is pushed inward of the vehicle, that is, the occupant M is moved in the direction away from the sidewall of the vehicle. As shown, when the deployed airbag deploys toward the shoulder of the occupant, it contacts the occupant's shoulder while substantially avoiding contact with the vehicle seat so as to move the occupant relative to the vehicle seat and sidewall, and pushes the occupant in the direction opposite to the sidewall.

Since the occupant M is moved in the direction kept away from the sidewall of the vehicle, space is compellingly secured between the occupant M and the sidewall of the vehicle.

According to this secured space, the occupant M may be prevented from colliding with the door 11 explosively forced into the vehicle cabin at the time of side collision. Thus, the possibility of injury to the upper body of the occupant M can be reduced. That is, the possibility of an injury within the region ranging from the head to the chest of the occupant M can be reduced.

Figure 15A:
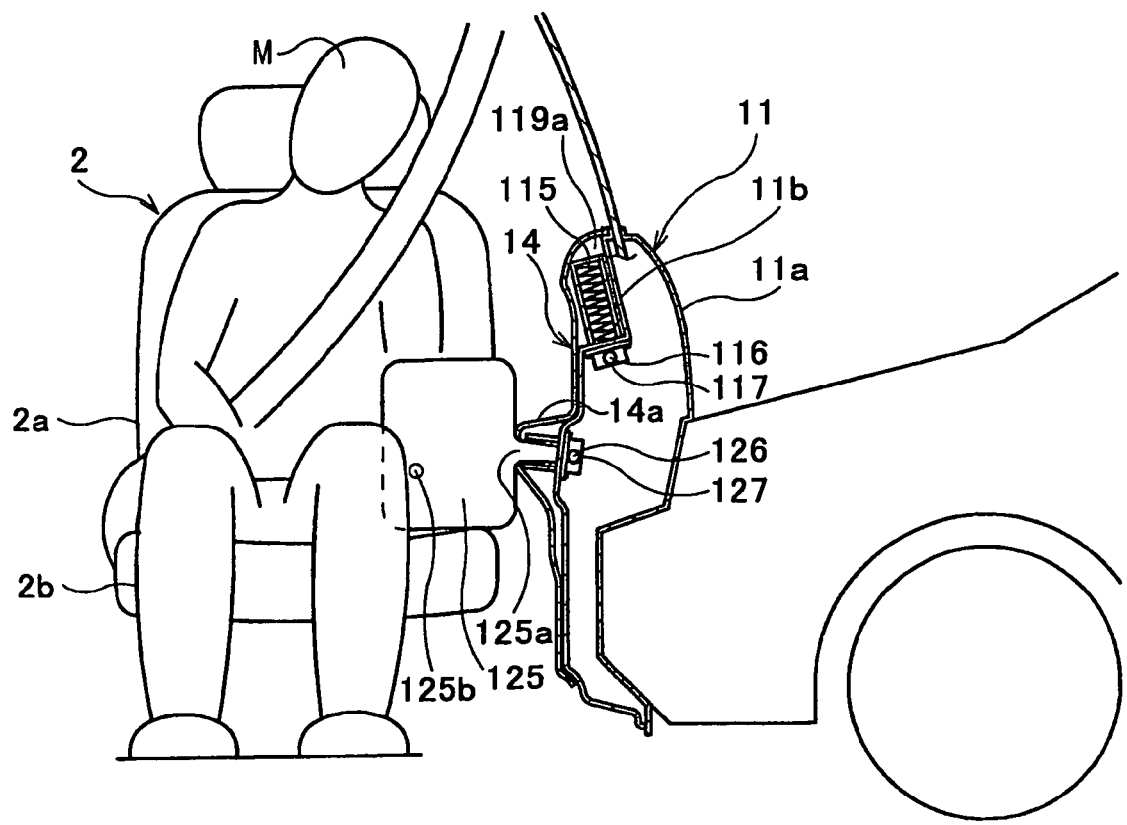
FIGS. 15A and 15B are front views showing operative condition of the side airbag apparatus according to modification in the fifth embodiment.
Figure 15B:
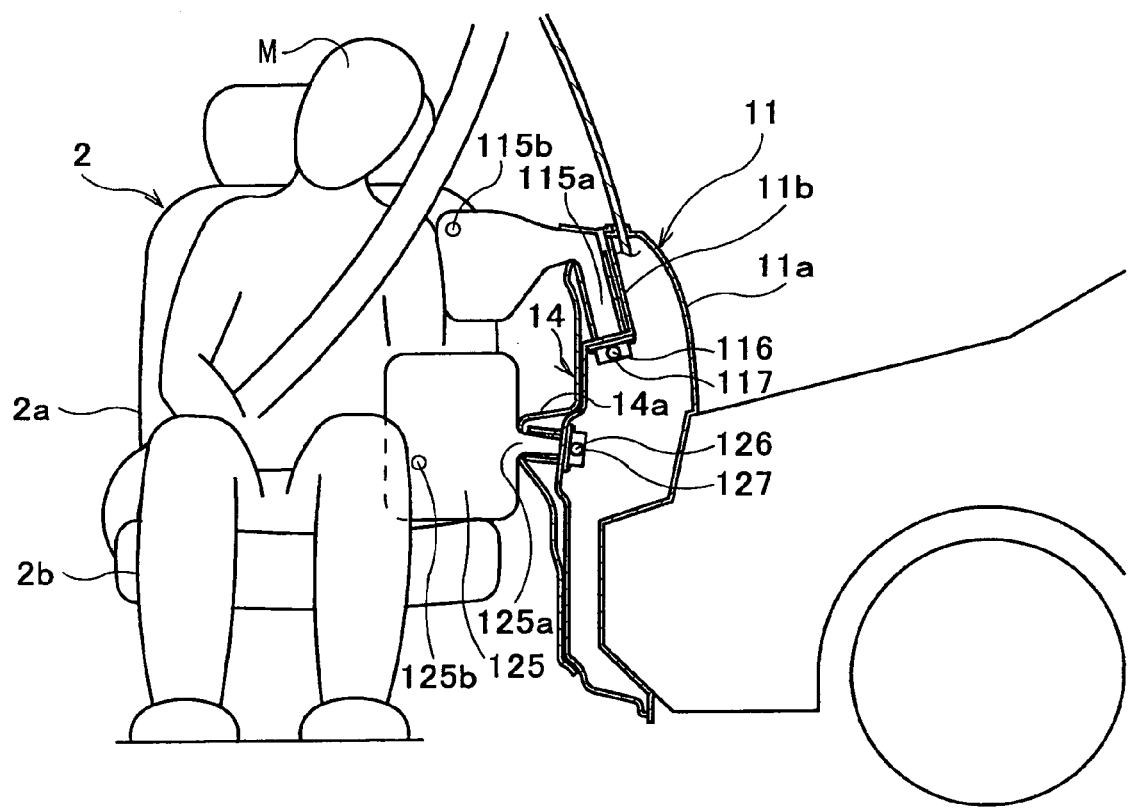

Alternatively, the inflator 126 is ignited by the control unit 130 as shown in FIG. 15A prior to the inflation of the shoulder airbag 115 as shown in FIG. 15B, and spouts gas for inflating the waist airbag 125.

Here, the inflation of the waist airbag 125 may be performed simultaneously with the inflation of the shoulder airbag 115. The gas blowout from the inflator 126 is injected into the waist airbag 125 through the gas inlet 125a, and then the airbag is inflated.

The waist airbag 125 inflated by the gas bursts through the tear line formed on the armrest 14a, and deploys toward the waist of the occupant M in the vehicle cabin. Then, the inflated waist airbag 125 reaches and contacts the region where the waist of the occupant M is positioned. Thus, the occupant M of the vehicle is pushed inward of the vehicle, that is, the occupant M is moved in the direction kept away from the sidewall of the vehicle.

As described above, in the present embodiment, after the inflation of the waist airbag 125 as shown in FIG. 15A, the shoulder airbag 115 bumps against the shoulder of the occupant M and moves the occupant M to the opposite direction as shown in FIG. 15B. Thus, not only the waist of the occupant M but also the shoulder of the occupant M are supported and pushed by the waist airbag 125 and the shoulder airbag 115, respectively.

Thereby, the oscillatory movements like a pendulum of the occupant M are prevented, and thus, the occupant M is prevented from collision with the sidewall by high probability. Then, the protection of the occupant M can accurately be performed.

In the above-described embodiment, the airbag is inflated towards both shoulder and waist of the occupant M, but the side airbag apparatus, in which only the shoulder airbag apparatus 110 is provided, may be acceptable.

Since space is compellingly secured between the occupant M and the sidewall of the vehicle even if only the shoulder airbag is provided, the upper body, that is, the region extending from the head to the chest of the occupant M is prevented from colliding with the sidewall rapidly deformed into the vehicle cabin.

In the above-described embodiment, the airbag is accommodated within the door. But the position where the airbag is provided, is not limited to these positions. The airbag may be provided in various positions. For example, the airbag may be provided at the sidewall in the case of the vehicles which do not have a door adjacent to each seat, such as busses and vans.

Sixth Embodiment

Another arranging manner of the airbag apparatus will now be described with reference to FIG. 11 and FIG. 12. In the following explanation, the components, which are the same as described in the first preferred embodiment would be indicated by the same symbol and the explanations thereof are omitted.

Figure 11:
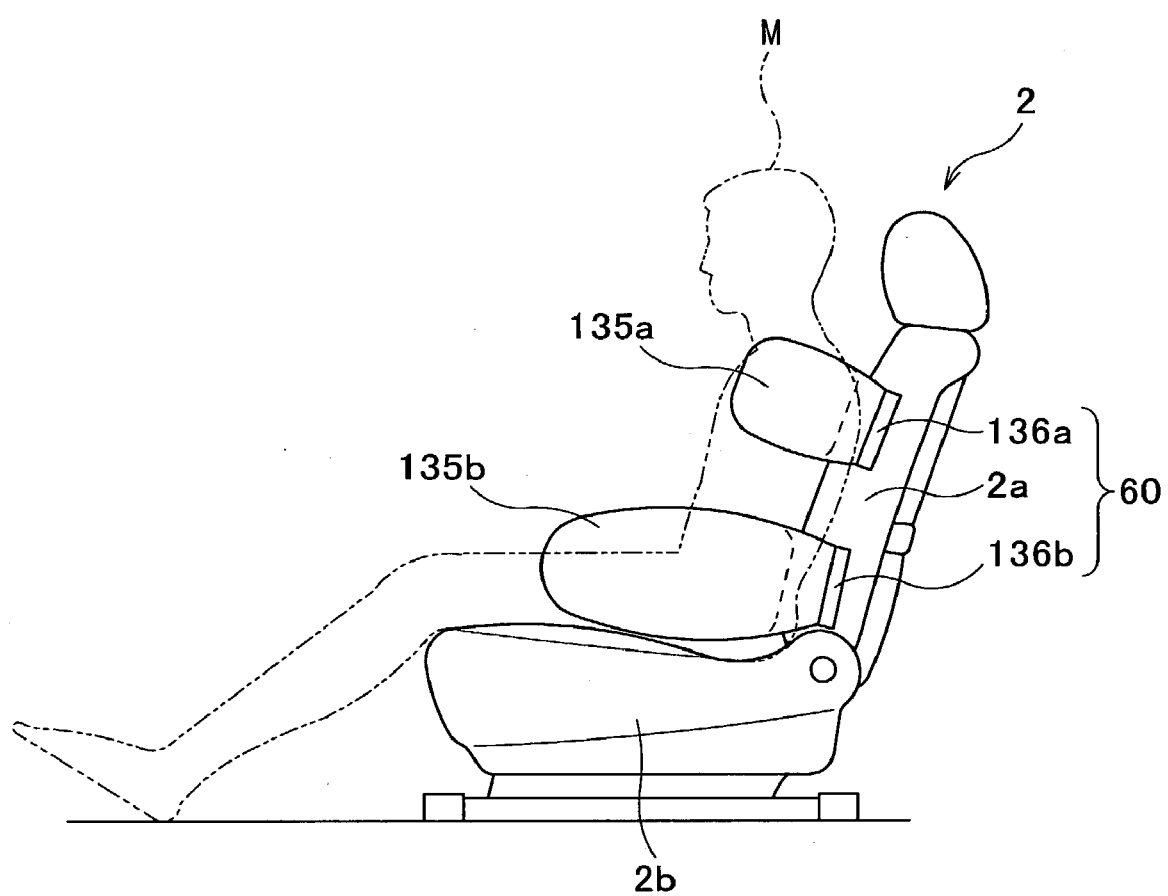
FIG. 11 is a side view showing the inflated airbag of the airbag apparatus according to the sixth preferred embodiment.

In the side airbag apparatus shown in FIG. 11, a shoulder airbag module 136a is provided on the side part at the upper part of the seatback 2a. The airbag module 136a is provided on a level with the shoulder of the occupant M. The waist airbag module 136b is provided on the side part at the lower part of the seatback 2a. This waist airbag module 136b is provided on a level with the hip of the occupant M.

The shoulder airbag 135a of the shoulder airbag module 136a is inflated frontward with respect to the seatback 2a, and reaches the sideward of the shoulder of the occupant M. Then, the shoulder airbag 135a deploys inwardly with respect to the vehicle, and pushes the shoulder of the occupant M to the inside of the vehicle.

The waist airbag 135b of the shoulder airbag module 136b is inflated frontward with respect to the seatback 2a, and reaches to the sideward of the hip and thigh of the occupant M. Then, the waist airbag 135b deploys inwardly with respect to the vehicle, and pushes the hip and thigh of the occupant M to the inside of the vehicle.

According to the airbag apparatus having these constructions, a space is compellingly secured between the upper body of the occupant M and the sidewall of the vehicle. Thereby, the occupant M is accurately prevented against the injury.

Seventh Embodiment

Figure 12:
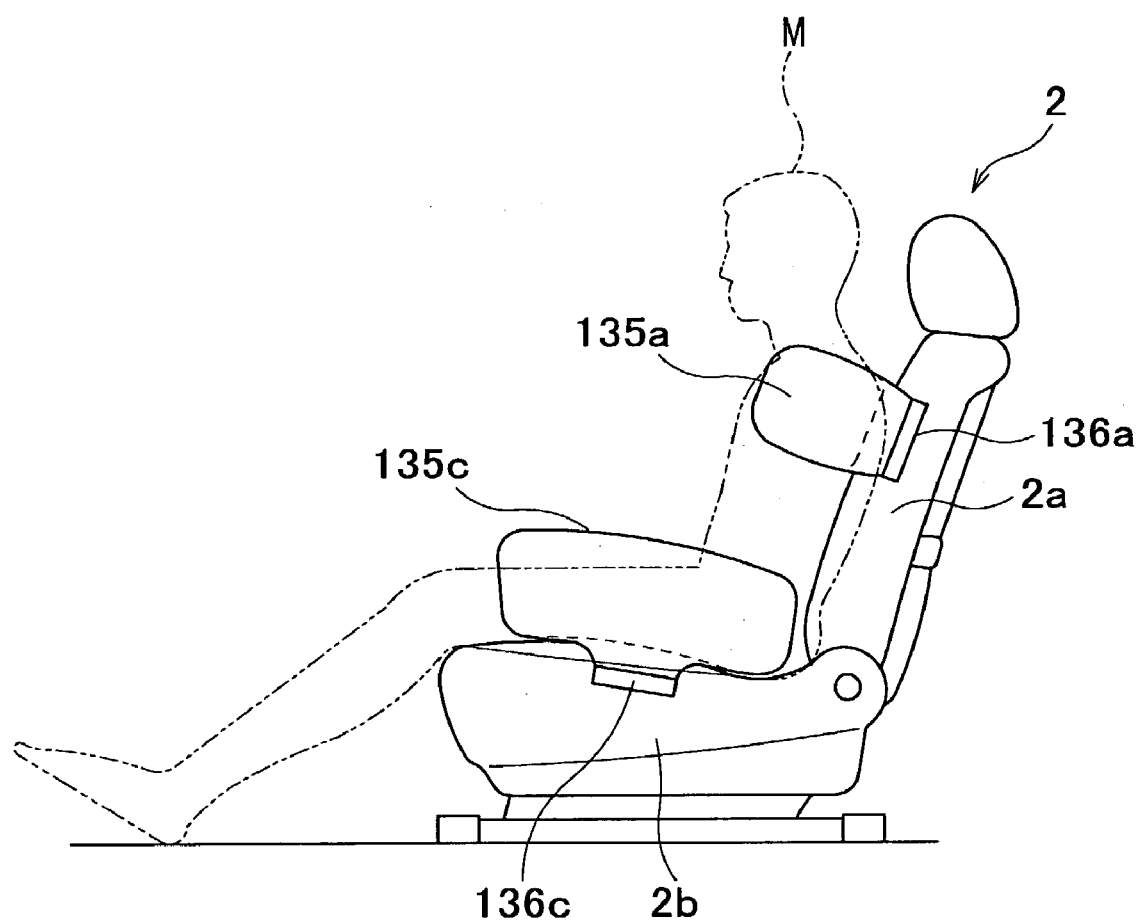
FIG. 12 is a side view showing the inflated airbag of the airbag apparatus according to the seventh preferred embodiment.

As shown in FIG. 12, the side airbag apparatus of seventh embodiment has a shoulder airbag module 136a provided on the side part at the upper part of the seatback 2a. The airbag module 136a is provided on a level with the shoulder of the occupant M.

The waist airbag module 136c is provided on the side part at about the center of the seat cushion 2b. In other words, this waist airbag module 136c is provided on the side part of the seat cushion 2b so that the thigh of the occupant M is covered by the inflated waist airbag 135b.

The shoulder airbag 135a of the shoulder airbag module 136a is inflated frontward with respect to the seatback 2a, and reaches to the sideward of the shoulder of the occupant M. Then, the shoulder airbag 135a deploys inwardly with respect to the vehicle, and pushes the shoulder of the occupant M to the inside of the vehicle.

The waist airbag 135c of the waist airbag module 136c is inflated upwardly with respect to the seat cushion 2b from the side thereof, and reaches to the side of the waist and thigh of the occupant M. Then, the waist airbag 135c deploys inwardly with respect to the vehicle and pushes the hip and the thigh of the occupant M to the inside of the vehicle.

According to the airbag apparatus having these constructions, space is compellingly secured between the upper body of the occupant M and the sidewall of the vehicle. Thereby, the occupant M is accurately prevented against the injury.

Eighth Embodiment

Finally, eighth embodiment of the present invention will be explained with reference to FIG. 13 and FIG. 14.

The airbag apparatus according to the present embodiment is provided at the sash of the door 11.

Figure 13:
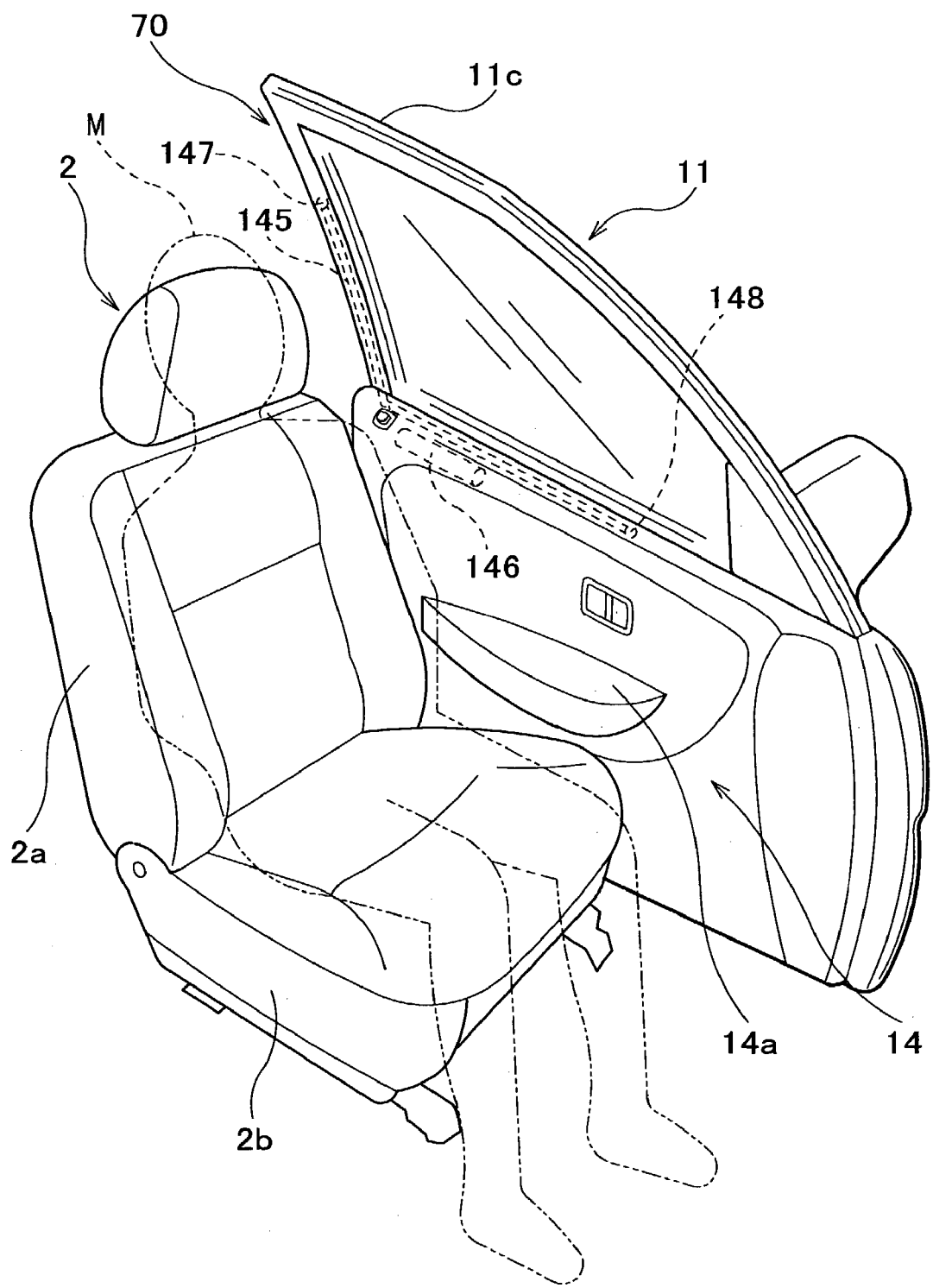
FIG. 13 is a perspective view showing the side airbag apparatus according to the eighth preferred embodiment.

As shown in FIG. 13, in the side airbag 60, an inflator 146 is provided at the top of a door trim 14. A shoulder airbag 145 is accommodated in the sash 11c of the door 11 and the top of the door trim 14 in the folded condition.

One end of the shoulder airbag 145 is fixed at the sash 11c of the door 11 by the anchor point 147. Here, the position of the anchor point 147 is on a level with the head of the occupant M. Another end of the shoulder airbag 145 is fixed at the top of the door trim 14 by the anchor point 148. Here, the position of the anchor point 148 approximately corresponds to with the front end of the seat cushion 2b. The shoulder airbag 145 between both ends is accommodated in the sash 11c and the top of the door trim 14.

In the side airbag apparatus 70, when a side collision with another vehicle is occurring and the acceleration sensor 131 detects an acceleration associated with a collision force, the control unit 130 ignites the inflator 146 in order to spout gas from the inflator 146 in response to the detected collision force. The gas blowout from the inflator 146 is injected into the shoulder airbag 145 through the gas inlet, and then the shoulder airbag 145 is inflated.

Figure 14:
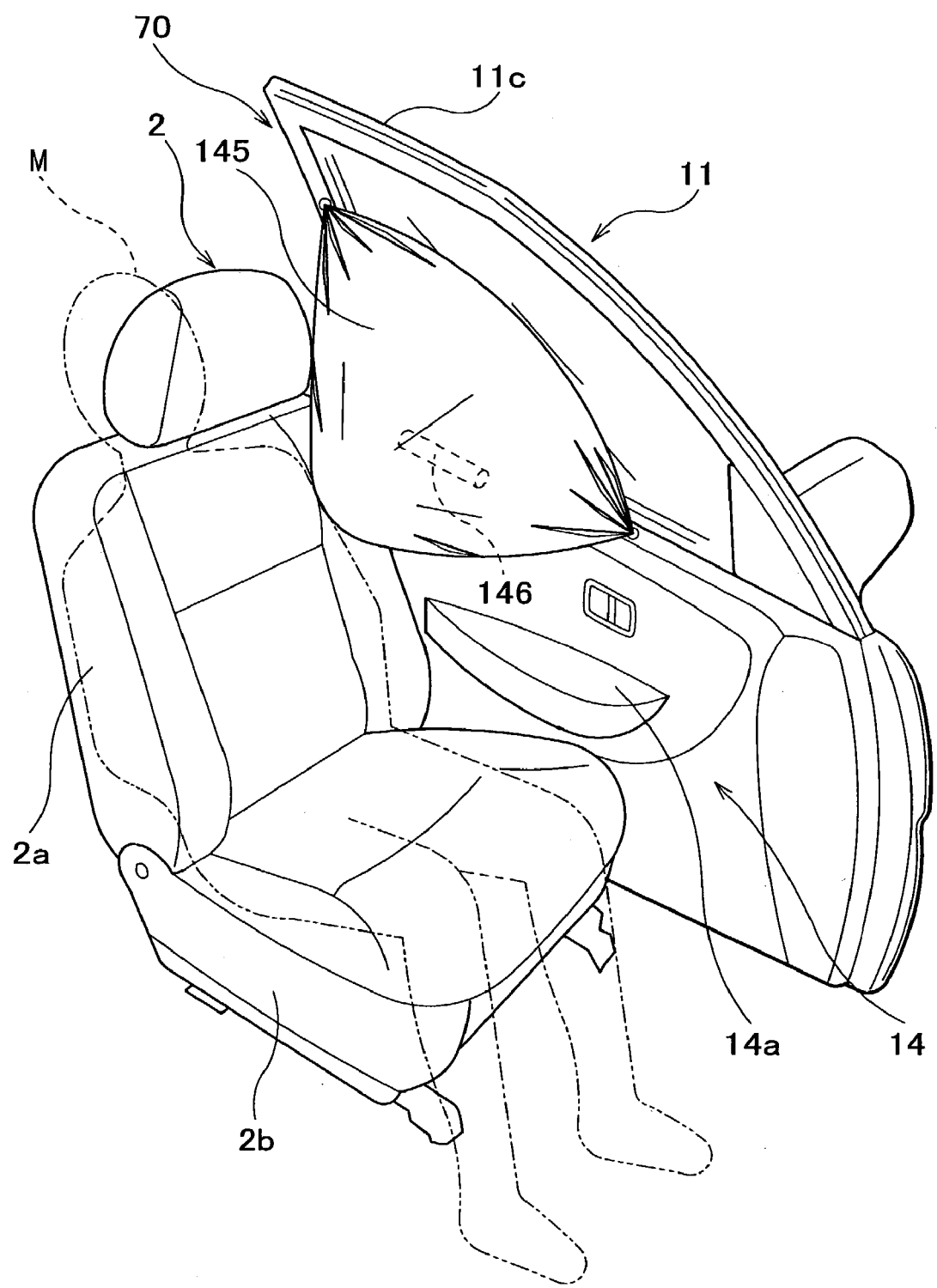
FIG. 14 is a perspective view showing the operative condition of the side airbag apparatus according to the eighth preferred embodiment.

The inflated shoulder airbag 145 burst through the tear line of sash 11c, and the tear line of the top of the door trim 14, and inflates toward the inside of the vehicle (as shown in FIG. 14).

The airbag 145 burst through the tear line deploys toward shoulder of the occupant M, and then reaches the region where the shoulder of the occupant M is positioning. Thus, the occupant M is pushed, inwardly. In other wards, since the occupant M is pushed by the inflated airbag 145, the occupant M is moved in the direction kept away from the sidewall of the vehicle.

Thereby, a space is compellingly secured between the occupant M and the sidewall of the vehicle. According to this secured space, the possibility of injury of the occupant in the event of side collision, etc., can be reduced.

As described above, the preferred embodiment of the present invention has been described.

In the above-described embodiments, for example, the airbag is accommodated within the door. But the position of the airbag to be provided is not limited to this. For example, the airbag may be provided within the seatback 2a of the seat, or may be provided within the seat cushion 2b.

What is claimed is:

1. A side airbag apparatus, which deploys an airbag between an occupant of a vehicle and a sidewall of the vehicle in order to protect the occupant in the event of side collision of the vehicle, the side airbag apparatus comprising:

an airbag unit, which includes
an airbag,
an inflator, which generates gas for inflating the airbag and supplies the gas to the airbag, and
a module case, which stores the airbag and the inflator therein and comprises an opening for the airbag when the inflator inflates the airbag; and
a control unit, which ignites the inflator in order to generate gas when acceleration greater than a prescribed value is detected, wherein the air bag, when inflated, inflates toward the occupant mainly in a direction substantially perpendicular and opposite to the side wall from the opening and contacts the waist of the occupant while substantially avoiding contact with a vehicle seat on which the occupant is disposed so as to move the occupant relative to the vehicle seat and sidewall in the direction opposite to the side wall from the opening, and pushes the occupant in the direction from the opening.

2. A side airbag apparatus according to claim 1, wherein the airbag unit is provided inside of a door of the vehicle.

3. A side airbag apparatus according to claim 1, wherein the airbag unit is provided within an armrest of a door of the vehicle.

4. A side airbag apparatus according to claim 1, wherein the airbag deploys toward a region ranging from a waist to a belly of the occupant, wherein the airbag is sized and shaped to contact the region ranging from a waist to a belly of the occupant.

5. A side airbag apparatus according to claim 4, wherein the airbag includes a partition which separates the airbag into sections which separately contact a hip and a belly, respectively, of the occupant, wherein a pressure of one of the sections, which is adapted to contact the belly of the occupant and includes a first gas outlet for exhausting a gas therein, is smaller than that of the other of the sections, which is adapted to contact the hip of the occupant, when the airbag is fully inflated, wherein the other of the sections includes a second gas outlet for exhausting a gas therein, and a size of the first gas outlet is greater than that of the second gas outlet.

6. A side airbag apparatus according to claim 5, wherein one of the sections adapted to contact the hip of the occupant projects further inwardly of the other of the sections adapted to contact the belly of the occupant.

7. A side airbag apparatus according to claim 4, further comprising an upper airbag unit, which comprises
a shoulder airbag, which, when inflated, deploys toward the occupant and contacts a shoulder of the occupant but substantially avoids contact with the seat so as to move the occupant relative to the vehicle seat and sidewall, and pushes the occupant in the direction opposite to the sidewall,
a shoulder airbag inflator, which generates gas for inflating the shoulder airbag and supplies the gas to the shoulder airbag, and
a module case, which stores the shoulder airbag and the shoulder airbag inflator therein, wherein
the shoulder airbag is sized and shaped to contact the shoulder of the occupant.

8. A side airbag apparatus according to claim 1, wherein the airbag deploys toward a region ranging from a waist to a leg of the occupant, and the airbag is sized and shaped to contact the region ranging from a waist to a leg of the occupant.

9. A side airing apparatus according to claim 8, further comprising a upper airbag unit, which includes
a shoulder airbag, which, when inflated, deploys toward the occupant and contacts a shoulder of the occupant while substantially avoiding contact with the vehicle seat so as to move the occupant relative to the vehicle seat and vehicle sidewall, and pushes the shoulder of the occupant in the direction opposite to the sidewall, a shoulder airbag inflator, which generates gas for inflating the shoulder airbag and supplies the gas to the shoulder airbag, and a module case, which stores the shoulder airbag and the shoulder airbag inflator therein, wherein the shoulder airbag is sized and shaped to contact the shoulder of the occupant.

10. A side airbag apparatus according to claim 1, further comprising an upper airbag unit, which includes a shoulder airbag, which, when inflated, deploys toward the occupant and contacts a shoulder of the occupant while substantially avoiding contact with the vehicle seat so as to move the occupant relative to the vehicle seat and vehicle sidewall, a shoulder airbag inflator, which generates gas for inflating the shoulder airbag and supplies the gas to the shoulder airbag, and a module case, which stores the shoulder airbag and the shoulder airbag inflator therein, wherein the shoulder airbag is sized and shaped to contact the shoulder of the occupant.

11. A side airbag apparatus according to claim 10, wherein the control unit ignites the inflator of the airbag unit prior to the ignition of the shoulder airing inflator.

12. A side airbag apparatus according to claim 1, wherein the airbag is a waist airbag, which deploys toward a region around a waist of the occupant, and the waist airbag is sized and shaped to contact the waist of the occupant.

13. A side air bag apparatus according to claim 12, further comprising an upper airbag unit, which comprises a shoulder airbag, which, when inflated, deploys toward the occupant and contacts a shoulder of the occupant while substantially avoiding contact with the vehicle seat so as to move the occupant relative to the vehicle seat and sidewall, and pushes the occupant in the direction opposite to the sidewall, a shoulder airbag inflator, which generates gas for inflating the shoulder airbag and supplies the gas to the shoulder airbag, and a module case, which stores the shoulder airbag and the shoulder airbag inflator therein, wherein the shoulder airbag is sized and shaped to contact the shoulder of the occupant.

14. A side airbag apparatus according to claim 1, wherein the airbag has a generally rectangular outer peripheral shape.

15. A side airbag apparatus according to claim 14, wherein a gas outlet which vents gas from the airbag in order to decrease impact force due to a collision between the airbag and the occupant while permitting a rate of outgassing that maintains sufficient gas pressure to push the occupant is formed in the vicinity of a contact surface between the airbag and the occupant.

16. A side airbag apparatus according to claim 1, wherein the opening of the module case is disposed at a position on the sidewall corresponding to a substantially horizontal plane which includes the waist of the occupant and wherein the opening is directed toward the waist of the occupant.

17. A side airbag apparatus according to claim 16, wherein the vehicle includes a seat back-seat cushion space which is partially bounded by a seat back and a seat cushion, and which occupant-holding surfaces of a scat back and a seat cushion of a vehicle commonly face, and wherein the airbag, when the gas is supplied thereto, extends in the seat back-seat cushion space near the occupant-holding surfaces and pushes the waist of the occupant to shift the occupant along and on the occupant holding surface of the seat cushion away from the sidewall and in the direction away from the opening, so that the inflated airbag partially occupies a space that was occupied by the occupant before the airbag is inflated.

18. A side airbag apparatus, which deploys an airbag between an occupant of a vehicle and a sidewall of the vehicle in order to protect the occupant in the event of side collision of the vehicle, the side airing apparatus comprising:

an upper airbag unit, which includes a shoulder airbag, a shoulder airbag inflator, which generates gas for inflating the shoulder airbag and supplies the gas to the shoulder airbag, and a shoulder airbag module case, which stores the shoulder airbag and the shoulder airbag inflator therein and comprises a shoulder airbag opening for the shoulder airbag when the shoulder airbag inflator inflates the shoulder airbag, and a control unit, which ignites the inflator in order to generate gas when an acceleration of greater than a prescribed value is detected, wherein the shoulder air bag, when inflated, inflates toward the occupant mainly in a direction substantially perpendicular and opposite to the side wall from the shoulder air bag opening and contacts the shoulder of the occupant while substantially avoiding contact with a vehicle seat on which the occupant is disposed so as to move the occupant relative to the vehicle seat and sidewall in the direction from the shoulder air bag opening, and pushes the occupant in the direction opposite to the side wall from the shoulder air bag opening.

19. A side airbag apparatus according to claim 18, wherein the shoulder airbag opening is disposed at a position on the sidewall corresponding to a substantially horizontal plane which includes the shoulder of the occupant and the shoulder airbag opening is directed toward the shoulder of the occupant.

20. A side airbag apparatus according to claim 19, wherein the vehicle includes a seat back-seat cushion space which is partially bounded by a seat back and a seat cushion, and which occupant-holding surfaces of a seat back and a seat cushion of a vehicle commonly face, and wherein the shoulder airbag extends in the seat back-seat cushion space near the occupant-holding surfaces and pushes the shoulder of the occupant to shift the occupant along and on the occupant holding surface of the seat cushion away from the sidewall in the direction away from the shoulder airbag opening, so that the inflated shoulder airbag partially occupies a space that was occupied by the occupant before the shoulder airbag is inflated.

* * * * *